(12) United States Patent
Buchholz

(10) Patent No.: US 11,440,669 B2
(45) Date of Patent: Sep. 13, 2022

(54) INTEGRATED SUPPORT STRUCTURE FOR AN AIRCRAFT ENGINE AND ITS AUXILIARY COMPONENTS

(71) Applicant: Rolls-Royce Deutschland Ltd & Co KG, Blankenfelde-Mahlow (DE)

(72) Inventor: Carsten Buchholz, Berlin (DE)

(73) Assignee: ROLLS-ROYCE DEUTSCHLAND LTD & CO KG, Blankenfel de-Mahlow (DE)

(*) Notice: Subject to any disclaimer, the term of this patent is extended or adjusted under 35 U.S.C. 154(b) by 293 days.

(21) Appl. No.: 16/210,919

(22) Filed: Dec. 5, 2018

(65) Prior Publication Data

US 2019/0168883 A1   Jun. 6, 2019

(30) Foreign Application Priority Data

Dec. 6, 2017   (DE) ............... 10 2017 129 060.5

(51) Int. Cl.
*B64D 27/26* (2006.01)
*F02C 7/32* (2006.01)
*F01D 25/28* (2006.01)
*B64D 27/14* (2006.01)
*F02C 7/20* (2006.01)

(52) U.S. Cl.
CPC ............ *B64D 27/26* (2013.01); *B64D 27/14* (2013.01); *F01D 25/28* (2013.01); *F02C 7/20* (2013.01); *F02C 7/32* (2013.01); *B64D 2027/264* (2013.01); *F05D 2240/90* (2013.01)

(58) Field of Classification Search
CPC .. B64D 27/26; B64D 27/14; B64D 2027/262; B64D 2027/264; F05D 2240/90; F01C 7/20
See application file for complete search history.

(56) References Cited

U.S. PATENT DOCUMENTS 4,044,973 A * 8/1977 Moorehead ............ B64D 27/20
                                                                244/54
4,068,470 A    1/1978 Sargisson et al.
(Continued)

FOREIGN PATENT DOCUMENTS

DE       2720957 A1    11/1978
DE       3741857 A1     6/1989
(Continued)

OTHER PUBLICATIONS

European Search Report dated Apr. 15, 2019 for counterpart European Patent Application No. 18209800.4.
(Continued)

*Primary Examiner* — Richard R. Green
*Assistant Examiner* — Ashesh Dangol
(74) *Attorney, Agent, or Firm* — Shuttleworth & Ingersoll, PLC; Timothy Klima

(57) ABSTRACT

A supporting structure arrangement for fastening an aircraft gas turbine engine to an aircraft, including: a supporting structural element of the aircraft engine and a supporting structure with at least one support and at least one bearing, by means of which the support can be connected or is connected to the aircraft, wherein the support can be connected or is connected rigidly to the supporting structural element of the aircraft engine by means of a connecting device.

11 Claims, 3 Drawing Sheets

(56) References Cited

U.S. PATENT DOCUMENTS

| | | | |
|---|---|---|---|
| 4,079,981 A * | 3/1978 | Mahler | B64D 27/26 |
| | | | 244/54 |
| 4,311,289 A * | 1/1982 | Finch | B64D 29/04 |
| | | | 244/55 |
| 4,821,980 A | 4/1989 | Clausen et al. | |
| 5,065,959 A | 11/1991 | Bhatia et al. | |
| 6,209,822 B1 | 4/2001 | Le Blaye | |
| 6,682,015 B2 | 1/2004 | Levert et al. | |
| 7,165,743 B2 | 1/2007 | Paspuer et al. | |
| 9,416,734 B2 * | 8/2016 | Thies | F02C 7/32 |
| 10,336,458 B2 * | 7/2019 | Guillemaut | B64D 27/20 |
| 2004/0035098 A1 * | 2/2004 | El Hamel | B64C 11/001 |
| | | | 60/224 |
| 2015/0239581 A1 * | 8/2015 | Tateiwa | B64D 27/26 |
| | | | 244/54 |
| 2017/0240288 A1 | 8/2017 | Pautis et al. | |
| 2017/0259928 A1 | 9/2017 | Lambey et al. | |
| 2017/0267365 A1 * | 9/2017 | Wright | B64D 45/00 |

FOREIGN PATENT DOCUMENTS

| | | |
|---|---|---|
| DE | 3813369 A1 | 11/1989 |
| DE | 3879605 T2 | 7/1993 |
| DE | 69912867 T2 | 7/2004 |
| DE | 60216375 T2 | 9/2007 |
| DE | 602004006463 T2 | 1/2008 |
| EP | 2965991 A1 | 1/2016 |

OTHER PUBLICATIONS

German Search Report dated Oct. 30, 2018 from counterpart German App No. 102017129060.5.

* cited by examiner

INTEGRATED SUPPORT STRUCTURE FOR AN AIRCRAFT ENGINE AND ITS AUXILIARY COMPONENTS

This application claims priority to German Patent Application DE102017129060.5 filed Dec. 6, 2017, the entirety of which is incorporated by reference herein.

The invention relates to a supporting structure arrangement for fastening an aircraft gas turbine engine on an aircraft according to the present disclosure and to an aircraft.

Aircraft gas turbine engines are often fastened to a fuselage or wing of an aircraft by means of an engine pylon serving as a supporting structure. In order to allow for forces acting during the operation of the aircraft engine and for the effects of material expansion due to changes in temperature, known aircraft gas turbine engines are mounted on the engine pylon in a statically determinate manner in such a way that each bearing point has at least one degree of freedom. U.S. Pat. No. 9,416,734 B2 describes such mounting.

One aim in the development of aircraft and aircraft engines is to reduce the fuel consumption and increase the range of the aircraft. The aerodynamic drag of the aircraft is a major factor in this. The casings of the aircraft engines are also a contributory factor. The aerodynamic drag could be effectively reduced by a casing with a smaller cross-sectional area while the power of the engine remains the same.

It is known from U.S. Pat. No. 4,068,470 A to relocate an accessory component of the aircraft gas turbine engine from the nacelle of the engine and arranged it in an engine pylon, in order in this way to reduce the cross section of the nacelle. However, further relocation of accessory components into the engine pylon is not readily possible with the arrangement described.

Modern aircraft gas turbine engines also often have a large number of accessory components, such as for instance a control system, a fuel feed device, an accessory gearbox and further components. Sometimes it is possible that there is an unused installation space between the accessory components.

The object is to provide an improved supporting structure arrangement that makes it possible in particular to further reduce the aerodynamic drag.

The object is achieved by a supporting structure arrangement with features as disclosed herein.

Accordingly, a supporting structure arrangement for fastening an aircraft gas turbine engine to an aircraft comprises a supporting structural element of the aircraft engine and a supporting structure. The supporting structure has at least one support and at least one bearing. By means of the at least one bearing, the at least one support can be connected or is connected to the aircraft. It is provided that the support can be connected or is connected rigidly to the supporting structural element of the aircraft engine by means of a connecting device (which is in particular at a distance from the bearing).

With the supporting structure arrangement, the aircraft engine is mounted or can be mounted on the aircraft in such a way that it is mounted on the aircraft in a statically determinate manner. The mounted aircraft engine is fixed on the aircraft in all six degrees of freedom (three rotational degrees of freedom and three translational degrees of freedom).

Since the connecting device provides a rigid connection, it can be designed in a particularly space-saving manner. As a result, the required installation space on the aircraft engine can be significantly reduced. This makes it possible to form a casing of the aircraft engine with a smaller diameter transversely in relation to a main axis of rotation of the aircraft engine. As a result, a reduced cross-sectional area, and consequently a much reduced aerodynamic drag, can be achieved, whereby the range of the aircraft can be increased and/or the fuel consumption of the aircraft can be reduced.

The at least one bearing may have at least one degree of freedom, in particular precisely one degree of freedom. In particular by the support being mounted on the aircraft or the support having in each case at least one degree of freedom per bearing, it is possible to allow for forces acting during the operation of the aircraft engine and for the effects of material expansion due to changes in temperature. As a result of the at least one degree of freedom, the bearing allows a movement between the components connected to one another by the bearing. As the at least one degree of freedom, the at least one bearing may for example have a rotational degree of freedom (for example in the form of a slide bearing rotatable about an axis) and/or a translational degree of freedom.

The supporting structure arrangement makes it possible to avoid critical vibration modes in frequency ranges at which unbalanced excitations could otherwise occur, in particular over relatively long time periods. As a result, both the weight of the supporting structure arrangement can be reduced and safety can be increased.

The rigid connection of the support (or of each of a number of supports) to the supporting structural element of the aircraft engine by the connecting device has no degree of freedom. The connecting device may provide a releasable or an unreleasable connection. For example, the connecting device is formed as a flange connection or comprises a flange connection, in particular with a multiplicity of releasable screws or bolts. Also, the connecting device may be formed as a dovetail connection or comprise a dovetail connection. Alternatively, the connecting device may be a material-bonding connection. For example, the connecting device is a welded connection. By means of the connecting device, the support and the supporting structural element can be connected in one piece.

The supporting structural element of the aircraft engine is designed to support the other engine components.

The supporting structure is formed for example as an engine pylon. The aircraft engine is in particular a jet engine, for example a turbofan engine.

The supporting structural element of the aircraft engine is for example part of a casing (or the casing) or part of a core engine case (or the core engine case) of the aircraft engine.

In one configuration, two or more bearings are provided, by means of which respectively the support can be connected or is connected to the aircraft. Each of these bearings optionally has at least one degree of freedom, in particular in each case precisely one degree of freedom. In the state in which it is connected to the aircraft by means of the bearings, the supporting structural element has no degree of freedom with respect to the aircraft. In this way it is possible to have a secure fastening of the aircraft engine to the aircraft that allows expansions and contractions caused by changes in temperature and also elastic deformations caused by forces occurring during operation of the components of the aircraft engine, of the supporting structure and of the aircraft. For example, one or more bearings is/are designed as a bolt connection, which in each case allows a rotation about an axis. The two or more bearings are spaced apart from one another, in particular in a direction parallel to the main axis of rotation of the aircraft engine. Preferably, at least three (in particular three, four or six) bearings are provided, arranged in particular spaced apart from one another in (at least) two directions.

The at least one support may have at least two bearings for connecting the support to the aircraft, the distance of which from one another along a direct connecting line is greater than the minimum diameter of the supporting structure between the aircraft engine and the aircraft in a direction parallel to the direct connecting line between the at least two bearings. The great distances allow the forces that are to be transferred to be reduced. As a result, a particularly stable attachment to the aircraft is made possible. Each of these two bearings may have at least one degree of freedom, in particular precisely one degree of freedom.

The supporting structure may comprise two or more spaced-apart supports. In particular, two or more supports may be spaced apart from one another axially with respect to the main axis of rotation of the aircraft engine. This makes a particularly stable supporting structure possible, in particular when there are great distances between the supports.

In one development it is provided that, in a state of the supports in which they are connected to the aircraft engine, the bearing or bearings of one support of the at least two supports is/are (respectively) at a distance from the bearing or bearings of another of the at least two supports that is greater than a length of a core engine and/or a casing of the aircraft engine (in the direction of the main axis of rotation of the aircraft engine) and/or than the overall length of the aircraft engine in the direction of the main axis of rotation of the aircraft engine. The rigid connections allow this arrangement to have in comparison a particularly great stability.

Optionally, at least one accessory component of the aircraft engine is arranged between the at least two in particular axially spaced-apart supports of the supporting structure. The accessory component can be accommodated in this intermediate space between the supports in a particularly space-saving manner. No space has to be provided within the casing of the aircraft engine, and so the casing can be designed to be particularly slender.

At least one accessory component may comprise a gear box, an arrangement of lines, a supply device and/or a control computer. Optionally, substantially all of the accessory components of the aircraft engine are arranged in the intermediate space between the supports.

In one development, an installation frame is provided, arranged between the at least two (in particular axially) spaced-apart supports of the supporting structure. Optionally, an installation frame such as that described in U.S. Pat. No. 9,416,734 B2 may be provided here, reference being made here in particular to the mounting of the installation frame. The at least one accessory component is mounted or can be mounted on the installation frame. Such an installation frame may in particular support a number of accessory components. These can consequently be installed and removed together and also be functionally inspected together, for example on a test facility, such as for instance a vibrating table. Inspection and maintenance of the accessory components can in this way be made considerably easier.

Optionally, at least one shock absorber and/or vibration isolator is provided, by means of which the installation frame is mounted or can be mounted on the aircraft engine, on the fastening device and/or on the aircraft. This allows damping from vibrations and shocks to be provided for all of the accessory components together that are mounted on the installation frame. This makes a much simpler construction possible in comparison with separate damping in each case of individual accessory components.

In one configuration, the bearing or each of a number of bearings comprises an elastic element (or generally a shock absorber). In the state in which it is connected to the aircraft, the elastic element (or the shock absorber) is arranged in the load path. A force acting on the aircraft engine consequently flows through the elastic element (the shock absorber) into the aircraft. In this way, a decoupling of vibrations and compensation for deformations can be provided. The elastic element (the shock absorber) can provide the at least one degree of freedom of the bearing. The elastic element comprises for example a rubber and/or a metal gauze or consists thereof.

According to one aspect, an arrangement which comprises a supporting structure arrangement of any design described herein and the aircraft engine is provided.

According to one aspect, an aircraft is provided. The aircraft comprises a fuselage and at least one aircraft gas turbine engine. In this case, a supporting structure arrangement of any design described herein is provided, the aircraft engine being fastened by means of the supporting structure of the supporting structure arrangement to the fuselage of the aircraft, to be precise in particular in the region of a tail of the aircraft. Such an aircraft can have a particularly low aerodynamic drag. This allows the range of the aircraft to be increased and/or the fuel consumption of the aircraft to be reduced.

Each of the bearings of the one or more supports may comprise a fastening point, which is fixedly connected to the fuselage of the aircraft and which is arranged in a pocket or clearance set back from an outer shell of the fuselage of the aircraft. This makes a further reduction of the aerodynamic drag of the aircraft possible. Moreover, the space of the pocket, in particular between a number of supports, can be used as an additional installation space for accessory components of the aircraft engine. This allows the distance between the aircraft engine and the aircraft to be reduced, which also makes possible a further reduction of the aerodynamic drag.

According to one aspect, a method for producing a supporting structure arrangement according to any configuration described herein is provided. The supporting structure in this case comprises at least two spaced-apart supports. By means of an optimization of the topology (in particular in an iterative process), at least one out of a distance of the supports from one another (for example a minimum distance and/or a distance between fastening points on the aircraft), a height, thickness and/or width of each of the supports and a relative material distribution of the supports is determined (for example the front support comprises at least twice as much material as the rear support). The supporting structure arrangement is produced correspondingly and can be assembled on an aircraft.

The invention is explained in connection with the exemplary embodiments represented in the figures, in which FIG. 1 shows a schematic perspective representation of an aircraft with aircraft engines arranged in the region of a tail of the aircraft;

Figure 1:
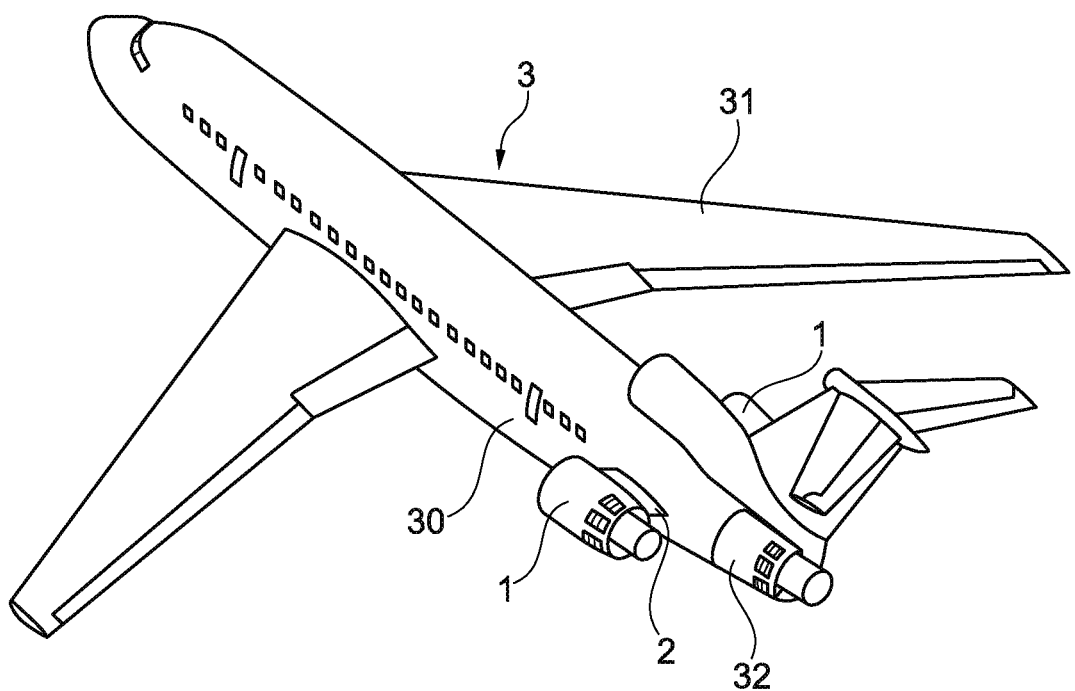

FIG. 1 shows an aircraft 3 with a number of gas turbine engines, by means of which the aircraft 3 can be driven. In the present case, the aircraft 3 comprises two engines 1, which are in each case fastened to the aircraft 3 by means of a supporting structure 2 in the form of an engine pylon, and an optional auxiliary engine 32, which is arranged centrally on the tail of the aircraft 3.

The two aircraft engines 1 that are fastened to the aircraft 3 in each case by means of a supporting structure 2 are mounted on opposite sides of the aircraft 3 on a fuselage 30 of the aircraft 3, in the present case in the region of the tail of the aircraft 3. Alternatively or in addition, aircraft engines 1 may also be mounted by means of the supporting structure 2 on wings 31 of the aircraft.

Figure 2:
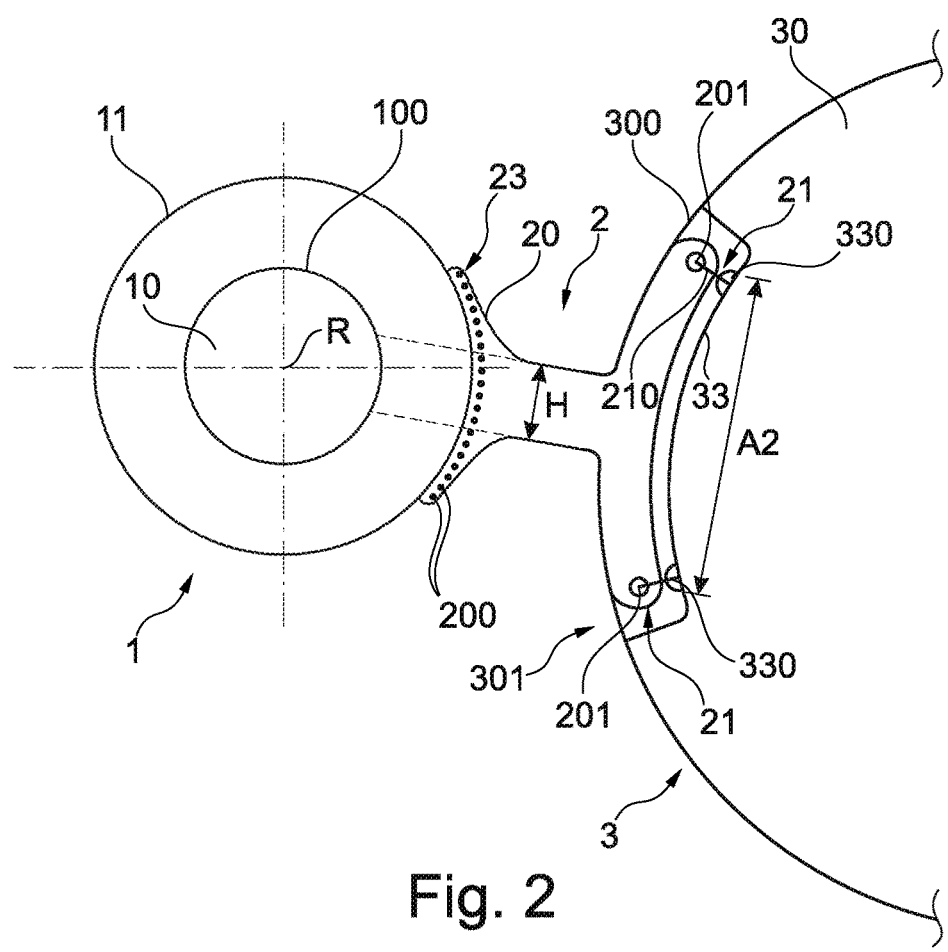
FIG. 2 shows a schematic cross-sectional representation of part of the aircraft according to FIG. 1 with one of the aircraft engines and with one embodiment of a supporting structure arrangement.
Figure 3:
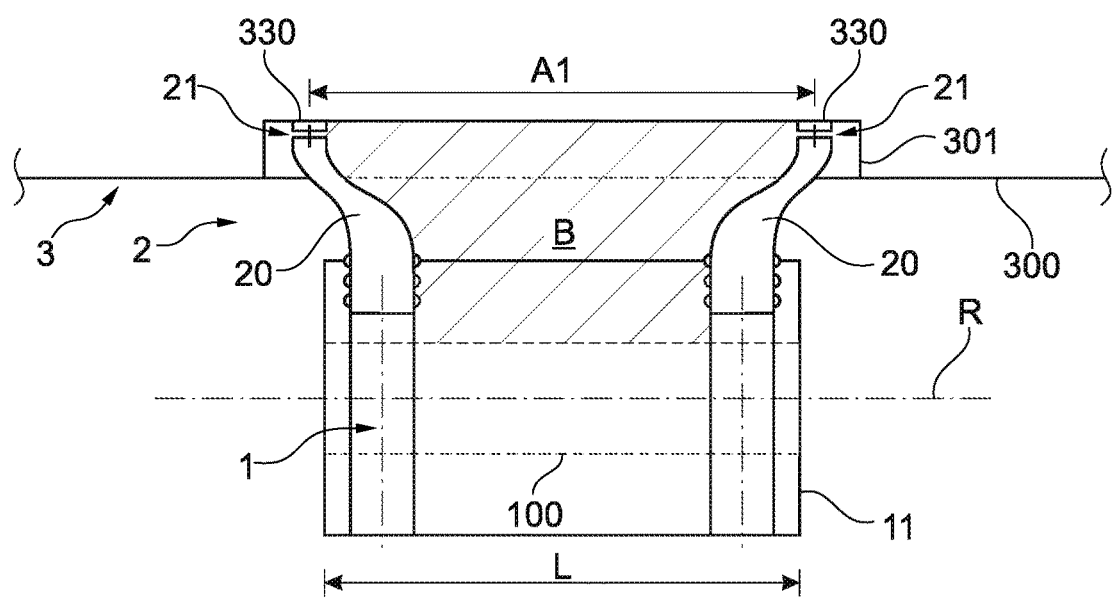
FIG. 3 shows a schematic plan view of the part of the aircraft shown in FIG. 2 with the aircraft engine and the supporting structure arrangement.

FIGS. 2 and 3 show various views of one of the aircraft engines 1 with its supporting structure 2 mounted on the fuselage 30 of the aircraft 3.

The aircraft engine 1 comprises a core engine 10, in which a combustion of fuel takes place. The core engine 10 comprises a core engine case 100. The core engine 10 is at least partially enclosed by an outer casing 11. In the present case, the casing 11 is formed as a supporting structural element, that is to say it can support the other components of the aircraft engine 1. The aircraft engine 1 is formed in the present case as a jet engine (for example as a turbofan engine) and comprises in particular a compressor and a turbine, which are rotatable about a main axis of rotation R.

Together with the casing 11, the supporting structure 2 forms a supporting structure arrangement for fastening the aircraft engine 1 to the aircraft 3.

The supporting structure 2 comprises two supports 20. In the side view (see FIG. 2 in particular), each of the supports 20 in the example shown has an H shape or double-T shape, although of course other shapes are also possible.

Each of the supports 20 comprises a first connecting portion, which lies flat against a connecting portion of the casing 11 of the aircraft engine 1. Each of the supports 20 comprises a number of fastening points 200 in the region of the first connecting portion. The fastening points 200 are for example holes for screws or bolts. Corresponding fastening points are formed on the connecting portions of the casing 11. The supporting structure 2 also comprises a number of screws or bolts by means of which the number of fastening points 200 of the supports 20 are fixedly connected to those of the casing 11. In this way, (at least) one connecting device 23 that rigidly connects the support 20 to the casing 11 is respectively provided per support 20.

Under the intended operating conditions of the aircraft engine 1 and the supporting structure 2, no relative movement is possible between the support 20 and the casing 11. The use of screws or bolts (or other releasable connecting means) makes the connecting device 23 releasable. The aircraft engine 1 can consequently be removed and/or mounted without the supporting device 2 on the aircraft 3 having to be mounted and/or removed from it. Alternatively, the connecting device 23 comprises an unreleasable connection, for example a welded connection.

The front support 20 is for example fixedly connected to a fan housing of the casing 11, the fan housing receiving a fan of the aircraft engine 1. The rear support 20 is optionally fixedly connected to a part of the casing 11 in the region of a turbine and/or a nozzle. In one configuration, the front support 20 is formed more massively than the rear support 20. For example, the front support 20 is at least partly formed as larger or thicker than the rear support 20.

In a method for producing the supporting structure arrangement, a method of topological optimization may be used in order to determine the material distribution between the supports 20 of the supporting structure arrangement (for example with the result that the front support 20 comprises more material than the rear support 20). For example, in this case a pylon height H is determined, as evident from the arrow in FIG. 2. Then the supporting structure arrangement is assembled, as shown in FIG. 2.

Each of the supports 20 comprises on a side opposite from the first connecting portion a second connecting portion. By means of the second connecting portion, each of the supports 20 can be connected to the aircraft 3. For this purpose, the supporting structure comprises a number of bearings 21, in the present case respectively two bearings 21 per support 20.

Both connecting portions (the vertical bars of the H shape) of each of the supports 20 extend along the circumference of the aircraft engine 1 or the fuselage 30 of the aircraft 3. The second connecting portion is longer than the first connecting portion along the respective circumferential direction. This is made possible in particular by the rigid connection to the first connecting portion.

Each of the bearings 21 has at least one degree of freedom, and therefore does not in itself provide a rigid connection.

The supports 20 are arranged spaced apart from one another, in the present case in a direction parallel to the main axis of rotation R of the aircraft engine 1 (or parallel to the cylinder axis of the at least partly cylindrical casing 11). As shown in FIG. 3, the supports 20 have an arcuate portion, in the present case a portion curved in an S-shaped manner. As a result, the first and second connecting portions of each of the supports 20 are arranged offset in relation to one another. The bearings 21 of the one support 20 are at a distance A1 from the bearings 21 of the other support 20. This distance A1 is greater than the distance of the first connecting regions of the two supports 20 from one another. The distance A1 is greater than the length L of the aircraft engine 1, in particular greater than the length of the core engine 10 and the casing 11. The distance A1 of the bearings 21 of the one support 20 from those of the other support 20 is consequently increased axially with respect to the aircraft engine 1. This increased distance A1 allows the forces during the operation of the aircraft engine 1 to be introduced particularly well into the fuselage 30 of the aircraft 3. As a result, while at the same time increasing installation space B between the supports 20 (as will be explained in more detail further below), the forces acting can be reduced.

Optionally, only one of the two supports 20, in particular the rear support 20 when viewed in the direction of flight, has an arcuate portion. The other of the two supports 20 may be formed as substantially straight in a view perpendicular to the main direction of rotation R.

In the case of each of the supports 20, the bearings 21 of the support 20 are spaced apart from one another, in the present case in a direction perpendicular to the main axis of rotation R of the aircraft engine 1 (or perpendicular to the cylinder axis of the at least partly cylindrical casing 11). The bearings 21 of each of the supports 20 are at a distance A2 from one another. The distance A2 between the bearings 21 is greater than the minimum diameter of the supporting structure 2 between the aircraft engine 1 and the aircraft 3 in a direction parallel to the direct connecting line between the at least two bearings 21. This minimum diameter of the supporting structure 2 corresponds to the pylon height H. This makes a particularly stable mounting of the aircraft engine 1 possible.

An installation space B is defined or provided between the supports 20. The distance of the supports 20 from one another, the distance A1 of the bearings 21 of the one support 20 from the bearings 21 of the other support 20 and the distance A2 of the bearings 21 of the respective support 20 from one another makes the installation space B particularly large. Moreover, the forces acting can be reduced.

Figure 4:
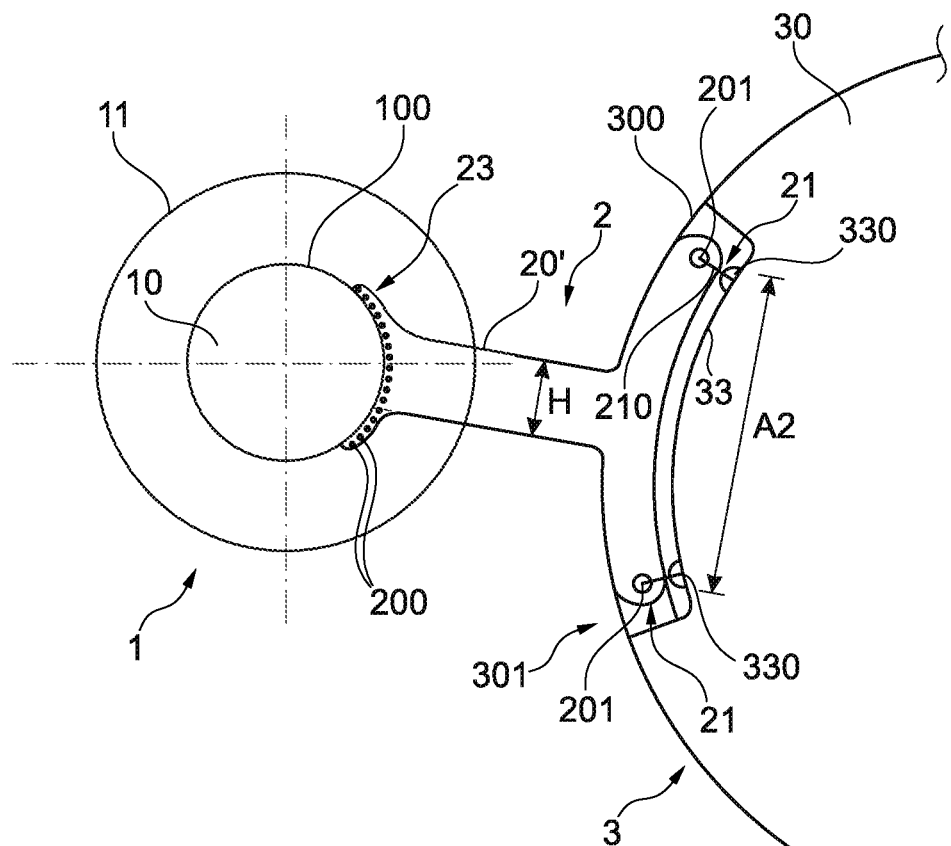
FIG. 4 shows a schematic cross-sectional representation of part of the aircraft according to FIG. 1 with one of the aircraft engines and with one embodiment of a supporting structure arrangement.
Figure 5:
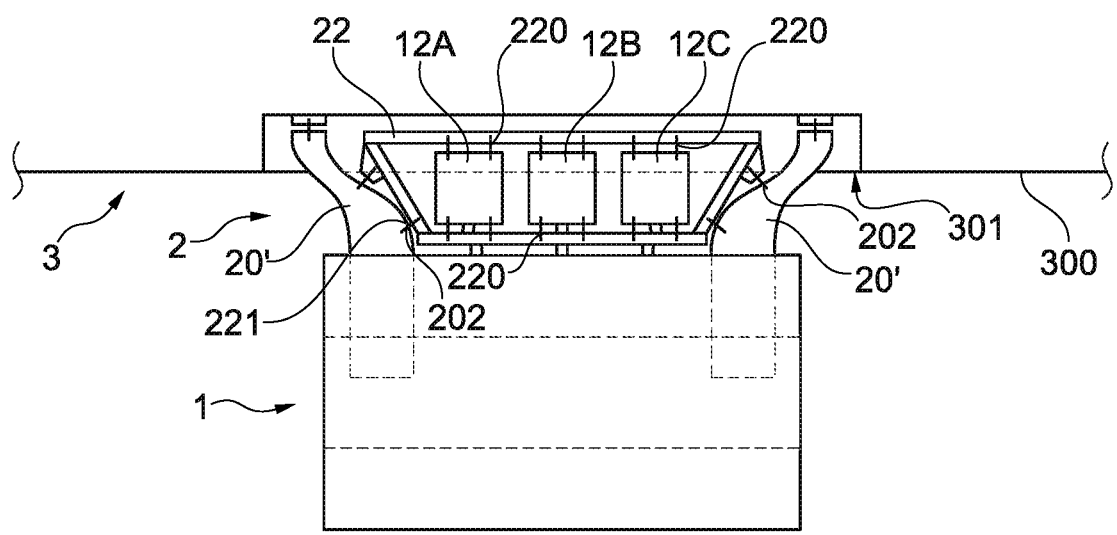
FIG. 5 shows a schematic plan view of the part of the aircraft shown in FIG. 4 with the aircraft engine and the supporting structure arrangement.

Accessory components of the aircraft engine 1 can be arranged in the installation space B, as will be further explained in detail in conjunction with FIGS. 4 and 5. These consequently do not have to be accommodated within the casing 11, as a result of which the casing 11 can have a particularly small cross section. This allows the aerodynamic drag of the aircraft engine 1 to be significantly reduced.

Moreover, the installation space B between the aircraft 3 and the aircraft engine 1 is particularly easily accessible, for example for installation or maintenance work.

By arranging the accessory components in the installation space B, and consequently closer to the fuselage 30 of the aircraft 3, the supports 20 can be formed in a particularly material-saving manner, which can lead to a weight saving.

Each of the bearings 21 comprises a bearing point 201 formed on the support 20, a fastening point 330 formed on the aircraft 3 and an elastic element 210 (or generally a damping element). The elastic element 210 is arranged in the load path or flux of force between the bearing point 201 of the support 20 and the fastening point 330 of the aircraft 3. Thus, the elastic element 210 can damp vibrations. The elastic element 210 can provide the at least one degree of freedom of the bearing. Alternatively or in addition, the bearing 21 comprises for example a pivoting connection. In this way, thermal expansion or contraction of the support 21 or other components can be allowed, without stresses occurring in the bearings 21.

As illustrated on the basis of FIGS. 2 and 3, the fastening points 330 on the aircraft 3 are not arranged outside, on an outer shell 300 of the fuselage 30 of the aircraft 3, but within a clearance or pocket 301 formed in the shell 300. The fastening points 300 are consequently set back from the outer shell 300 (into the interior of the fuselage 30). As a result, the second connecting portions of the supports 20 are arranged within the shell 300 (within a continuously convex form of the shell 300). This makes it possible to increase the installation space B and/or significantly reduce the aerodynamic drag, or at least not increase it, in comparison with an arrangement outside the shell 300.

The fastening points 330 of the aircraft 3 are fixed or integrally formed on a supporting structure 33 of the aircraft 3, for example in the form of a supporting frame of the aircraft 3.

A further increased installation space B can also be provided by the pocket 301. The installation space B consequently extends into the interior of the fuselage 30. A casing of the supporting structure arrangement can enclose the installation space B.

FIGS. 4 and 5 show a design of a supporting structure arrangement for fastening the aircraft engine 1 to the aircraft 3, the core engine case 100 of the aircraft engine 1 serving as a supporting structural element. The supports 20' of the supporting structure 2 consequently extend into the casing 11 of the aircraft engine 1. The respective first connecting portion of the supports 20 lies flat against a corresponding connecting portion of the core engine case 100. In a way corresponding to the design according to FIGS. 2 and 3, a connecting device 23, which provides a rigid connection of the support 20' to the supporting structural element, here the core engine case 100, is respectively provided.

As illustrated in particular on the basis of FIG. 5, the supporting structure arrangement also comprises an installation frame 22. The installation frame 22 may be formed as a so-called space frame. The installation frame 22 supports a number of accessory components 12A-12C of the aircraft engine 1. One accessory component 12A comprises a control computer of the aircraft engine 1. The control computer is connected by cables to at least one actuator element and/or at least one sensor of the aircraft engine 1 within the casing 11. One accessory component 12B comprises a gear box of the aircraft engine 1. The gear box is for example an auxiliary gear box, which can be driven by a shaft, which is operatively connected to an engine shaft that is rotatable about the main axis of rotation R. One accessory component 12C comprises a supply device. The supply device provides for example electrical power and/or a fluid to the aircraft engine 1, in particular fuel and/or lubricant. The fuel feed may take place by means of a feed line, which extends from the installation space B (for example at least partly in a straight line) into a region of the core engine 10 facing the installation space B, which allows particularly short and simple routing of the line.

Each of the accessory components 12A-12C is mounted at bearing points 220 of the installation frame 22.

The installation frame 22 is mounted on the supports 20' at bearing points 202 of the supports 20'. For damping vibrations, the installation frame 22 is attached to the bearing points 220 of the supports 20' by means of shock absorbers 221 (for example in the form of elastic elements). Consequently, a number of accessory components 12A-12C can be protected together against vibrations, which makes a simplified construction possible. Alternatively or in addition, the installation frame 22 could also be mounted on the aircraft 3 and/or on the aircraft engine 1.

The use of the installation frame 22 makes it possible that a number of accessory components 12A-12C can be installed and removed together. This allows the maintenance of the aircraft engine 1 to be made significantly easier. The connection of the accessory components 12A-12C to the aircraft engine 1, in particular to the core engine 10, can be provided by means of standardized interfaces for fuel, air, oil and signals. The installation frame 22 makes use of such standardized interfaces possible.

Furthermore, the loaded installation frame 22 can be tested as a whole, i.e. it is not necessary for each accessory component to be tested individually, which can reduce quality compliance and approval costs.

The fact that the accessory components 12A-12C are not arranged directly on the core engine 10, but in the installation space B, makes it easier to shield them from high temperatures during the operation of the aircraft engine 1. Optionally, the installation frame 22 as a whole is provided with thermal insulation, which can in an easy way protect a number of accessory components, 12A-12C together from thermal loads.

Consequently, with the supporting of the aircraft engine 1 and the accessory components 12A-12C, a number of functionalities can be integrated in the supporting structure 2.

Otherwise, the design of the supporting structure arrangement according to FIGS. 4 and 5 coincides with that according to FIGS. 2 and 3, and so reference is made to the statements made in respect thereto. Conversely, the design according to FIGS. 2 and 3 may comprise an installation frame 22 according to FIGS. 4 and 5.

The aircraft 3 may be in particular a supersonic aircraft. Aircraft engines 1 of supersonic aircraft are often particularly long, so in this case a particularly large installation space B is produced by the supporting structure arrangements described above.

LIST OF DESIGNATIONS

1 Aircraft gas turbine engine
10 Core engine
100 Core engine case
11 Casing
12A-12C Accessory component
2 Supporting structure
20, 20' Support
200 Fastening point
201 Bearing point
202 Bearing point
21 Bearing
210 Elastic element
22 Installation frame
220 Bearing point
221 Shock absorber
23 Connecting device
3 Aircraft
30 Fuselage
300 Shell
301 Pocket
31 Wing
32 Auxiliary engine
33 Supporting structure
330 Fastening point
A1, A2 Distance
B Installation space
H Pylon height
L Length
R Main axis of rotation

The invention claimed is:

1. An aircraft comprising:
 a fuselage with an outer shell and a pocket set inwardly from the outer shell of the fuselage of the aircraft;
 an aircraft engine;
 a supporting structure arrangement for fastening the aircraft engine to the aircraft, comprising:
  a core engine of the aircraft engine, the core engine including a supporting structural element,
  a supporting structure configured to be a primary bad support of the aircraft engine with respect to the aircraft, the supporting structure including an engine side connected to the supporting structural element and an aircraft side connected to the aircraft, the supporting structure including at least one support and at least one bearing,
  at least one connecting device at the engine side rigidly connecting the support to the supporting structural element of the core engine, the connecting device including a surface that at least partially surrounds the core engine and lies flat against the supporting structural element of the core engine;
  wherein the at least one support includes two spaced-apart supports;
  wherein, with the two spaced-apart supports connected to the aircraft engine, the at least one bearing of one of the two spaced-apart supports is positioned at a distance from the at least one bearing of another of the two spaced-apart supports, the distance being greater than a length of at least one chosen from the core engine and a casing of the aircraft engine:
 the aircraft engine being fastened by the supporting structure of the supporting structure arrangement to the fuselage of the aircraft:
 wherein the at least one bearing comprises at least one fastening point, which is fixedly connected to the fuselage of the aircraft and which is arranged in the pocket set inwardly from the outer shell of the fuselage of the aircraft;
 wherein at least one accessory component of the aircraft engine is arrange in an installation space between the two supports, entirely outside the casing of the aircraft engine and at least partially within the pocket set inwardly from the outer shell of the fuselage of the aircraft.

2. The aircraft according to claim 1, wherein the at least one bearing includes two bearings, each of the two bearings having at least one degree of freedom.

3. The aircraft according to claim 1, wherein the at least one bearing includes two bearings for connecting the support to the aircraft, a distance of which from one another is greater than a minimum diameter of the supporting structure between the aircraft engine and the aircraft in a direction parallel to a direct connecting line between the two bearings.

4. The aircraft according to claim 1, wherein the two supports are spaced apart in an axial direction of the aircraft and the at least one accessory component of the aircraft engine is arranged between the two spaced-apart supports.

5. The aircraft according to claim 4, wherein the at least one accessory component comprises at least one chosen from a gearbox, an arrangement of lines, a supply device and a control computer.

6. The aircraft according to claim 4, and further comprising an installation frame, which is arranged between the two spaced-apart supports and to which the at least one accessory component is fastened.

7. The aircraft according to claim 6, and further comprising at least one shock absorber mounting the installation frame on at least one chosen from the aircraft engine, the supporting structure and the aircraft.

8. The aircraft according to claim 1, wherein the at least one bearing comprises at least one chosen from a shock absorber and an elastic element arranged in a load path of the supporting structure between the aircraft engine and the aircraft.

9. The aircraft according to claim 1, wherein the at least one accessory component comprises at least one chosen from a gearbox, an arrangement of lines, a supply device and a control computer.

10. A supporting structure arrangement for fastening an aircraft engine to an aircraft having a fuselage with an outer shell, comprising:
 a core engine of the aircraft engine, the core engine including a supporting structural element,
 a supporting structure configured to be a primary load support of the aircraft engine with respect to the aircraft, the supporting structure including an engine side connected to the supporting structural element and an aircraft side connected to the aircraft, the supporting structure including at least one support and at least one bearing,
 at least one connecting device at the engine side rigidly connecting the support to the supporting structural element of the core engine, the connecting device including a surface that at least partially surrounds the core engine and lies flat against the supporting structural element of the core engine;
wherein the at least one support includes two supports spaced apart from one another in an axial direction of the aircraft and defining an installation space therebetween positioned entirely outside an external casing of the engine and at least partially within a pocket set inwardly from the outer shell of the fuselage of the aircraft; and
at least one accessory component of the aircraft engine being arranged in the installation space between the two supports, entirely outside the external casing of the engine and at least partially within the pocket set inwardly from the outer shell of the fuselage of the aircraft.

11. The supporting structure arrangement according to claim 10, wherein the at least one accessory component comprises at least one chosen from a gearbox, an arrangement of lines, a supply device and a control computer.

* * * * *